Nov. 9, 1937.  E. G. CARROLL  2,098,653
HYDRAULIC BRAKE APPARATUS
Filed April 16, 1928
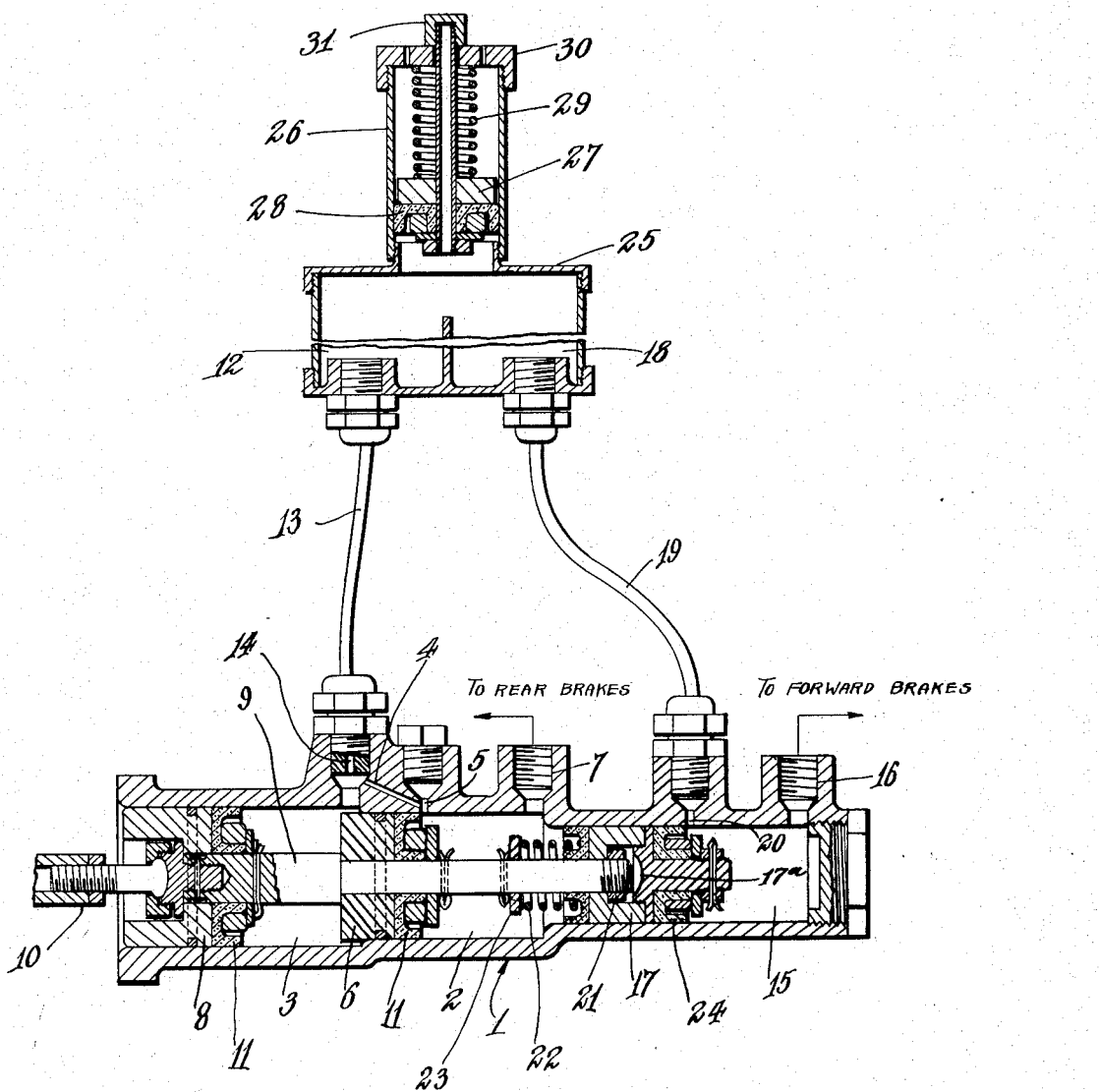
Inventor
Eugene G. Carroll
By Lyon & Lyon
Attorneys Patented Nov. 9, 1937

2,098,653

UNITED STATES PATENT OFFICE 2,098,653

HYDRAULIC BRAKE APPARATUS

Eugene G. Carroll, Los Angeles, Calif., assignor, by mesne assignments, to Bendix Brake Company, South Bend, Ind., a corporation of Illinois Application April 16, 1928, Serial No. 270,286

17 Claims. (Cl. 60—54.6)

This invention relates to a hydraulic brake apparatus. Such brakes are usually applied by means of a piston moving in a master cylinder. Usually a port for supplying the operating liquid to the interior of the cylinder is located just forward of the normal or inactive position of the piston. When the piston moves forwardly it closes the port, but some of the liquid escapes through this port while the piston is crossing it, and in this way there is developed a lost motion effect which interferes with the effective application of the brakes tending to make their action tardy and with a diminished pressure for applying them.

One of the difficulties encountered in the use of such hydraulic brake apparatus for automobiles is that if leakage occurs of the liquid from the brake system, the brakes are not reliable in their operation. In most four wheel brake systems, the master cylinder is connected to all of the brakes so that if an accident occurs to the apparatus, all of the brakes are usually inoperative.

In my Patent 1,770,064 issued July 8, 1930 on an application 214,330 filed August 20, 1927 and copending with this application, I disclosed arrangements tending to solve the above difficulties.

Another of the disadvantages arising from connecting all of the brakes with the master cylinder is that the pressure applied to the forward brakes is the same as that applied to the rear brakes and the effect of this sometimes is that the same actual braking force is delivered at the forward wheels as at the rear wheels. This is now recognized as bad practice in brake operation at high speeds and it is now generally believed that the braking force applied to the forward brakes should never be greater than that applied to the rear brakes.

The general object of this invention is to provide a hydraulic brake apparatus which will overcome all of the difficulties referred to above and which will be reliable in operation.

A specific object is to provide a brake apparatus in which the pressure applied to the forward brakes will be less than that applied to the rear brakes.

A further object of the invention is to provide another simple means different from the means disclosed in my said patent for maintaining a supply of operating liquid for the chambers of the master cylinder and to provide a construction which will insure that there will be no loss of pressure for the reasons given above.

One of the objects of the invention disclosed in my patent is to construct the parts in such a way that there will be no loss of pressure in the working chamber at the commencement of the braking stroke of the pistons. The invention involves the use of a booster chamber located at the rear end of the master cylinder so that any leakage past the brake piston of the master cylinder will be caught in the booster chamber, and also includes a by-pass for connecting the booster chamber with the working chamber of the master cylinder. These parts are so constructed that there will be no loss of working pressure as the pistons move forward.

A further object of the invention disclosed herein is to provide in combination with such a structure, a hydraulic brake apparatus which, in operation, will apply the rear brakes a short time in advance of the forward brakes. This is most advantageous because when the forward brakes are applied at about the same instant as the rear brakes, any maladjustment in the apparatus might effect the application of the forward brakes first. This would tend to produce skidding at the rear of the automobile, particularly if the car were being steered to one side.

A further object of the invention disclosed in my patent is to provide a hydraulic brake apparatus of the type indicated above, in which the pressure system connected to the rear brakes is separated from the pressure system connected to the forward brakes and yet these pressures are maintained balanced and equalized when the master cylinder piston is in released position. Moreover when the brakes are applied the pressures in the two systems are increased proportionately by reason of a floating piston having a limited motion relative to a main piston connected to the operating member.

It is a further object of the invention disclosed herein to provide means for maintaining both of the pistons referred to above so positioned when the brake is released that there is substantially no lost motion in applying the brake.

A further object of the invention is to provide another simple means different from the means disclosed in my patent for maintaining a pressure in such a brake system higher than atmospheric pressure.

It is a further object to combine the above desirable features into an operative practical structure in which the piston positioning device is effective regardless of differences in pressure on one or both of said pistons caused by said higher than atmospheric pressures.

Further objects of the invention will appear hereinafter.

The invention consists of the novel parts and combinations of parts to be described hereinafter, all of which contribute to produce an efficient hydraulic brake apparatus.

A preferred embodiment of the invention is described in the following specification, while the broad scope of the invention is pointed out in the appended claims.

The drawing shows a longitudinal section through a master cylinder embodying my invention and represents the connections from a reservoir which I prefer to use with the system. The connections to the brakes are also indicated.

Referring more particularly to the parts, 1 represents a master cylinder. This cylinder is preferably constructed with a chamber 2 of relatively small diameter which constitutes a working chamber or working bore for supplying liquid under pressure to the brakes. To the rear of the chamber 2 I provide the master cylinder with a chamber 3 of relatively larger diameter. These two chambers are connected by a by-pass 4 having a port 5 opening through the wall of the chamber 2 just in advance of the inactive position of a piston 6 that works in the chamber 2.

The chamber 2 is provided with a threaded boss 7 from which a connection may be had to the brakes of the automobile. Sometimes in brake apparatus, such a connection from this point is made to all the wheel brakes. I prefer, however, merely to connect it to the rear brakes and to provide another chamber as will be described hereinafter for supplying liquid to the forward brakes. The piston 6 is connected to work in unison with a booster piston 8 to which end these two pistons are attached to a common piston rod 9. The booster piston 8 is provided with an adjustable connection 10 for connecting it with a brake pedal not illustrated, such as commonly used on automobiles. These pistons are provided with suitable cup-leathers 11. The operating liquid is supplied from a reservoir 12 to a suitable pipe 13 and at the connection of this pipe to the interior of the chamber 3 I provide an orifice 14 which is relatively small. My reason for doing this will appear hereinafter.

The reservoir 12 is provided with a tight cover 25. This cover preferably has automatic means for constantly maintaining pressure above atmosphere in the apparatus. This consists of an expansion pressure chamber in the form of a cylinder 26 carrying a hydraulic piston 27 with cup-leather 28, and urged downwardly by a coil spring 29 in the upper end of the cylinder and thrusting against the under side of a vented bonnet 30. The piston has a tubular piston rod that is closed above the bonnet by a screw cap 31.

By removing this cap 31 the oil or other liquid in the system may be replenished from time to time, and if desired this liquid may be forced in under pressure, thereby forcing the piston 27 part way up in the cylinder 26 and compressing the spring which then maintains a high pressure in the system.

The parts of the apparatus described above can be used in any hydraulic brake system and when so used they will have substantially the following mode of operation: When the brake pedal is depressed and the pistons 6 and 8 move forward in unison, by reason of the large area of the piston 8, a relatively large quantity of liquid will move out of the forward end of the chamber 3. The liquid forced out of the chamber 3 in this way will of course raise the level of the liquid in the reservoir 12. At the same time, by reason of the inertia of the column of liquid in the pipe 13 augmented by the relatively small orifice 14, the forward movement of the piston 8 will develop and maintain pressure in the liquid. This will prevent any loss of pressure in the chamber 2 as the piston 6 crosses the port 5. In this way when the piston 6 has crossed this port and the real application of pressure at the brakes begins, there will be full pressure in the chamber 2.

The master cylinder is preferably constructed so as to operate the forward brakes with a pressure slightly below the pressure developed in the chamber 2. When this is desired, I provide a forward brake chamber 15 formed at the forward end of the master cylinder in axial alignment with the other two chambers 2 and 3. This chamber 15 has a threaded bore 16 or other means for connecting it to the forward brakes. In the chamber 15 a forward brake piston 17 moves. Operating liquid is supplied from a reservoir 18 through a pipe 19 to the interior of the forward brake chamber 15 to a port 20 in its wall just forward of the piston 17. There is a lost motion connection between the piston rod 9 and the piston 17, that is to say, the piston 17 can slide relatively toward the left on a piston rod as shown in the drawing.

Its movement in the other direction is prevented by a nut 21 mounted on the threaded end of the piston rod. I provide a yielding connection between the piston rod and the piston 17. This yielding connection is preferably in the form of a coil spring 22 which thrusts against a collar 23 on the piston rod 9.

The mode of operation of the chamber 15 cooperating with this piston 17 is substantially as follows: When the brake pedal is applied and pressure is developed in the chamber 2, the piston rod 9 will be advancing toward the right. This will transmit force to the piston 17, partly through the spring 22, and partly by liquid pressure, and the pressure developed in the chamber 15 will, during braking, be less than that existing in the chamber 2 for the following reasons. The effective area of the front of the piston 6 is at least as great as the effective area of the forward face of the piston 17. The effective area at the rear of piston 17 is less than the effective area at the front end of that piston. Thus the pressure developed in the chamber 15 at all times except when the front of the rod 21 contacts the face 17ᵃ, equals the pressure in the chamber 2 multiplied by the relatively small area of the rear face 17 and divided by the relatively large area of the front face thereof, plus the strength of the spring. When the fluid pressures in the chambers are low as when the brakes are released and during the takeup phase of brake application, the spring 22 holds the piston 17 forward at its forward limit of movement.

It may be noted that the area of the forward face of the piston 17 is larger than the area of the rearward face thereof. Assuming the fluid pressures in chambers 2 and 15 are equal there will be a greater total fluid force tending to move the piston 17 rearward than the total fluid force tending to move it forward because of said larger area at the front. However, unless the difference in total pressures on said faces is great the spring still holds the piston 17 forward as far as the nut 21 allows, as is shown in the drawing. However, as higher braking pressures are developed it may happen that with such higher pressures if the fluid pressure in chamber 15 approaches the pressures in chamber 2, the excess in the total pressure on the front face of piston 17 over that on the rear face of said piston may increase considerably and become stronger than the force of spring 22. Then the piston 6 and nut 21 will move forward relative to the piston 17 and cause a desired increase in the fluid pressures in the chamber 2. The fact that the effective area of the piston 6 is larger than that of the front of piston 17 cooperates with the floating piston 17 to insure that greater braking pressures will be transmitted to the rear brakes than to the front brakes. As the piston 6 advances it displaces liquid in the chamber 3 due to the fact that the piston 8 is of larger diameter than the piston 6. This develops pressure in the chamber 3 which is only partially relieved by the open passage 14. In this way pressure is maintained in the liquid in the port 4 as the piston 8 advances across the port 5 which communicates with the by-pass 4. During the clearance takeup phase of brake application, the spring maintains the piston in the same position relative to the rod 9 as is shown in the drawing. This insures a prompt closing of the port 20. Just as the booster piston 8 is effective to minimize the loss of liquid through the port 5 when the brakes are being applied, the spring 22 is effective to minimize loss through the port 20 by insuring the closing of the port 20 at the earliest possible time. As is shown, the spring positions the piston 17 just rearward of the port 20 and holds the piston forward while the brakes are released. The pressure in reservoir 12 due to spring 28 acts on both surfaces of piston 17 and therefore would, but for the spring 22, tend to move the piston 17 rearwardly due to the larger area of the forward (right) side of the piston exposed to said pressure. The spring also holds the piston forward during the slack takeup portion of the brake applying stroke so that the port 20 is quickly covered. After the piston 17 has crossed the port 20 sufficiently to close it, a higher positive pressure will be developed in the chamber 15 that will be imparted to the forward brakes. This piston 17 is provided with a cup-leather 24 similar to the cup-leathers 11 already described. This apparatus may operate under a static head due merely to the elevation of the reservoir 12. In this case the reservoir may be left open. It is desirable, however, that the apparatus may be operated under the considerably higher pressure provided by the arrangement of the reservoir 12 previously described in order to further minimize the loss of liquid though the ports 15 and 20.

In the normal operation of the master cylinder, it will be evident as explained above that the pressure that applies the rear brakes will be developed slightly before the pressure is developed in the cylinder 15 and the forward brakes. This is desirable because it prevents any possibility of the forward brakes being applied before the rear brakes. The latter should be avoided because it tends to produce skidding of the rear end of the car if the forward brakes are suddenly applied.

Another desirable effect of the lost motion connection is that in case the rear brake should become inoperative for any reason, there is still a slight lost motion in the application of the forward brakes. Thus in the operation of the master cylinder, in case of failure of the rear brakes when there is no pressure in the cylinder 2, it will be evident that the first part of the movement of the piston rod 9 will be effected without imparting any movement to the piston 17 except what movement could be applied through the slight additional compression of the spring 22. This spring, however, is a light spring and does not transmit any movement to the piston 17 from the first movement of the piston rod 9. In other words, the piston 17 would not commence to move until the end of the rod seats against the face 17ᵃ of the piston 17 that would limit the movement of the piston rod toward the right.

But when the brakes are released, by reason of the fact that the two reservoir chambers 12 and 18 communicate above, the pressure is equalized in the forward and rear brakes. And if either chamber 12 or 18 becomes drained of oil as a consequence of a break in the forward or rear brake pipes, the other chamber will maintain an oil supply for the set of brakes remaining intact. The subject matter of certain claims herein is also shown but is not claimed in Patent 1,770,064 which was copending with this application.

It is understood that the embodiment of the invention described herein is only one of the many embodiments this invention may take, and I do not wish to be limited in the practice of the invention, nor in the claims, to the particular embodiment set forth.

I claim:

1. In a hydraulic brake apparatus for applying brakes by the actuation of a pedal, the combination of a master cylinder having a chamber of a given diameter and a chamber of relatively larger diameter, a piston mounted in the smaller chamber and a piston mounted in the larger chamber, and having means for connecting the same with the brake-pedal, said pistons being connected to move in unison, an unobstructed by-pass connecting the said chambers, with a port opening through the wall of the smaller chamber at such a point that it is traversed by the smaller piston in its movement, and means for connecting the relatively small chamber to the brakes, the piston in the relatively large chamber operating, when moved forwardly, to maintain the pressure in the smaller chamber while the smaller piston is crossing the said port.

2. In a hydraulic brake apparatus for applying brakes by the actuation of a pedal, the combination of a master cylinder having a chamber of a given diameter and a chamber of relatively larger diameter, a piston mounted in the smaller chamber and a piston mounted in the larger chamber, and having means for connecting the same with the brake-pedal, said pistons being connected to move in unison, an unobstructed by-pass connecting the said chambers, including a port in the wall of the smaller chamber positioned at such a point that it is traversed by the smaller piston in its movement, a reservoir for supplying the operating liquid to the said chambers and in constant communication with the chamber of larger diameter, means for connecting the relatively small chamber to the brakes, the piston in the relatively large chamber operating, when moved forwardly, to maintain the pressure in the smaller chamber while the smaller piston is crossing the said port.

3. In a hydraulic brake apparatus for applying brakes by the actuation of a pedal, the combination of a master cylinder having a chamber of a given diameter and a chamber of relatively larger diameter, a smaller piston mounted in the smaller chamber and a piston mounted in the larger chamber, and having means for connecting the same with a brake-pedal, said pistons being connected to move in unison, an unobstructed by-pass including a port positioned at such a point that it is traversed by the smaller piston in its movement and connecting the said chambers, a reservoir having a relatively small orifice connecting the same with the said chambers for supplying operating liquid thereto, and means including a port for connecting the relatively small chamber to the brakes, the larger piston in the larger chamber and the said smaller piston cooperating, when the pistons are moved forwardly, to develop and maintain pressure in the smaller chamber while the smaller piston is crossing the said first named port.

4. In a hydraulic four wheel brake apparatus for applying brakes by the actuation of a pedal, the combination of a master cylinder having a rear brake chamber of a given diameter and a booster chamber of relatively larger diameter and having a port leading to said rear brake chamber and an unobstructed passage extending from said port to said booster chamber, a smaller piston mounted in the smaller chamber positioned normally just rearward of said port and a piston mounted in the booster chamber connected with the brake-pedal to be moved in unison, means for connecting the rear-brake chamber to the rear brakes, said master cylinder having a forward brake chamber in alinement with the first named chambers to connect with the forward brakes, a piston in the last named chamber for operating the forward brakes, and a connection between the first named pistons and the last named piston for actuating the same, the piston in the booster chamber operating, when moved forwardly, to maintain the pressure in the rear-brake chamber while the smaller piston is crossing the said port.

5. In a hydraulic brake apparatus for applying brakes by the actuation of a pedal, the combination of a master cylinder having a chamber of given diameter for operating the rear-brakes, and a chamber of relatively larger diameter coaxial with the first named chamber, a rear-brake piston mounted in the smaller chamber and a booster piston mounted in the large chamber with means for connecting the pistons together and to the brake pedal for operating the same, an unobstructed by-pass connecting the said chambers, and having a port opening through the wall of the smaller chamber, said cylinder having a forward-brake chamber forward of the relatively small cylinder, and of smaller diameter than the relatively small cylinder for operating the forward brakes, a forward-brake piston movable in the last named chamber, means for supplying the operating liquid to the first named chambers and to the last named chamber, and a yielding connection between the piston in the relatively smaller cylinder and the forward-brake piston operating to retard the development of pressure in the forward-brake chamber.

6. In a hydraulic brake apparatus for applying brakes by the actuation of a pedal, the combination of a master cylinder having a rear-brake chamber of a given diameter and a booster chamber of relatively larger diameter coaxial therewith, a rear-brake piston movable in the rear-brake chamber and a booster piston movable in the booster chamber, means for connecting said pistons to move in unison and for connecting the same with the brake-pedal, a by-pass connecting the booster chamber to the rear brake chamber having a port opening through the wall of the rear brake chamber located just in advance of the rear brake piston, means for supplying liquid to the said chambers, said cylinder having a forward-brake chamber with means for supplying liquid thereto, a forward-brake piston in said forward brake chamber with a spring connection between the same and the first named pistons operating to retard the development of pressure in the forward brake chamber.

7. In a hydraulic brake apparatus for applying brakes by the actuation of a pedal, the combination of a master cylinder having a forward chamber of a given diameter and a rear chamber of relatively larger diameter, a forward piston and a rear piston working in said chambers, respectively, and connected together so as to be moved in unison by the brake pedal, the forward chamber having a connection to the brakes, an unobstructed by-pass from the rear chamber to the forward chamber having a port opening through the wall of the forward chamber located just forward of the forward piston, and means for maintaining said chambers supplied with the operating liquid, the piston in the rear chamber operating, when moved forwardly, to maintain the pressure in the forward chamber as the forward piston crosses said port.

8. In a hydraulic brake apparatus for applying brakes by the actuation of a pedal, the combination of a master cylinder having a forward chamber of a given diameter and a rear chamber of relatively larger diameter, a forward piston and a rear piston working in said chambers respectively and connected together so as to be moved in unison by the brake pedal, the forward chamber having a connection to the brakes, an unobstructed by-pass from the rear chamber to the forward chamber having a port opening through the wall of the forward chamber located just forward of the forward piston, a reservoir for the operating liquid connected with the rear chamber, the piston in the rear chamber operating, when moved forwardly, to maintain the pressure in the forward chamber while the forward piston is crossing the said port.

9. In a hydraulic brake apparatus for applying brakes by the actuation of a pedal, the combination of a master cylinder having a forward chamber of a given diameter and a rear chamber of relatively larger diameter, a forward piston and a rear piston working in said chamber respectively and connected together so as to be moved in unison by the brake pedal, the forward chamber having a connection to the brakes, an unobstructed by-pass from the rear chamber to the forward chamber having a port opening through the wall of the forward chamber located just forward of the forward piston, a reservoir having a relatively small orifice for supplying operating liquid to the rear chamber, the piston and the rear chamber, when moved forwardly, cooperating with the said relatively small orifice to develop and maintain pressure in the liquid within the chambers and prevent loss of pressure in the forward chamber when the forward piston is moving across the said port.

10. In a hydraulic four-wheel brake apparatus for applying brakes by the actuation of a pedal, the combination of a master cylinder having a forward-brake chamber to connect with the forward brakes and a rear brake chamber to connect with the rear brakes, a piston mounted to move in the rear brake chamber with means for actuating the same by the brake-pedal, a forward-brake piston mounted to move in the forward brake chamber, a common piston-rod for said pistons, the said forward brake piston having a sliding connection with the said piston rod, and yielding means for imparting the forward movement of the piston rod to the forward brake piston operating to yield and retard the development of pressure in the forward-brake chamber.

11. In a hydraulic four-wheel brake apparatus for applying brakes by the actuation of a pedal, the combination of a master-cylinder having a forward chamber of a given diameter and a rear chamber of relatively larger diameter, a forward piston and a rear piston working in said chambers respectively and connected together so as to be moved in unison by the brake pedal, the forward chamber having a connection to the forward brakes, a valveless by-pass from the rear chamber to the forward chamber having a port opening through the wall of the forward chamber located just forward of the forward piston, and a reservoir for the fluid with a valveless connection to the rear chamber, the piston in the rear chamber operating when moved forwardly, to maintain pressure in the liquid filling the port from the rear chamber into the forward chamber and prevent loss of pressure in the forward chamber.

12. In hydraulic brake apparatus for applying forward brakes and rear brakes, the combination of a master cylinder having spaced inlet ports and having a pressure chamber arranged to communicate with the rear brakes and a pressure chamber arranged to communicate with the forward brakes, a plunger movable in the first named pressure chamber to develop pressure therein, a plunger movable in the second named chamber to develop pressure therein, and a resilient connection between the plungers including also a lost motion connection associated therewith, for resiliently urging said plungers to a position in which each is positioned just rearwardly of one of said inlet ports, the connections serving for operating the second named plunger whereby brake applying pressure is developed for the rear brakes before brake applying pressure is developed for the forward brakes, said lost motion connection being capable, after the lost motion has been taken up, of communicating movement directly from the first named plunger to the second named plunger.

13. In fluid pressure apparatus for applying a plurality of brakes, a source of liquid supply, a master cylinder having a plurality of inlet ports connected to said source and a plurality of outlet ports each leading to one of said brakes, a pair of spaced pistons positioned in said master cylinder, one of which is positioned between a pair of said outlet ports and which has a larger liquid pressure receiving face on one side than on the other, means for exerting a greater than atmospheric pressure on the liquid supplied from said source through said ports to said cylinder and thus acting on said pistons, a lost motion mechanical connection between said pistons, and a spring for resiliently urging said pistons toward a certain spaced relationship in which each is positioned just rearwardly of one of said inlet ports and for counterbalancing the overbalancing force due to the pressure on the larger face.

14. In fluid pressure apparatus for applying a plurality of brakes, a source of liquid supply, a master cylinder having a plurality of inlet ports connected to said source and a plurality of outlets each leading to one of said brakes, a pair of spaced pistons positioned in said master cylinder one of which is positioned between a pair of said outlets, a lost motion mechanical connection between said pistons, and a spring for resiliently urging said pistons toward a certain spaced relationship in which each is positioned just rearwardly of one of said inlet ports.

15. A hydraulic brake system, a master cylinder, a fluid reservoir, and a piston in said fluid reservoir, a resilient means for urging said piston downward to place the fluid in said reservoir under super-atmospheric pressure, a tube extending through said piston, a stop member secured to said tube for limiting the downward movement of said piston, and a cap secured to the upper end of said tube for closing said upper compartment.

16. In a hydraulic braking system for use in combination with a wheel cylinder, a master cylinder having a brake pressure chamber connected to the wheel cylinder, and a booster chamber positioned back of said brake pressure chamber and having a port formed through a wall thereof into said pressure chamber and leading to said booster chamber and having an unobstructed passage extending from said port to said booster chamber, pistons mounted in both chambers and both connected to the brake pedal to be moved in unison and so that said forward piston may move across said port, means for connecting the pressure chamber to the wheel cylinders, and means comprising the piston in said booster chamber for operating when moved forwardly to maintain the pressure in the pressure chamber while the forward piston is crossing the port.

17. In hydraulic brake apparatus for applying front brakes and rear brakes, the combination of a source of supply of liquid, a master cylinder having a pressure chamber arranged to communicate with the rear brakes and a pressure chamber arranged to communicate with the front brakes and having ports connecting each of said chambers to said source of supply of liquid, a plunger movable in the first named chamber to develop pressure therein and normally positioned just rearwardly of the supply port for said first named chamber, a plunger movable in the second named chamber to develop pressure therein and normally positioned just rearwardly of the supply port for said second named chamber, one of said plungers having faces of unequal area, one of which is acted on by the fluid pressure in one chamber, and the other of which is acted on by the fluid pressure in the other chamber, means for exerting a greater than atmospheric pressure on the liquid in said source and thus on the liquid in said chambers so that said liquid reacts on the plungers in their normal position, and a resilient connection between the plungers including a lost motion connection associated therewith, said connection tending to urge the plungers to said normal position in which each plunger is positioned just rearwardly of one of said ports and the connections serving for operating one of said plungers, said lost motion being capable after motion has been taken up of communicating movement directly from one plunger to the other.

EUGENE G. CARROLL.